July 23, 1929.  W. L. SEMON ET AL  1,721,838
METHOD AND APPARATUS FOR ADHESIVELY APPLYING TUBULAR
LININGS TO METAL PIPES AND THE LIKE
Filed Oct. 13, 1927
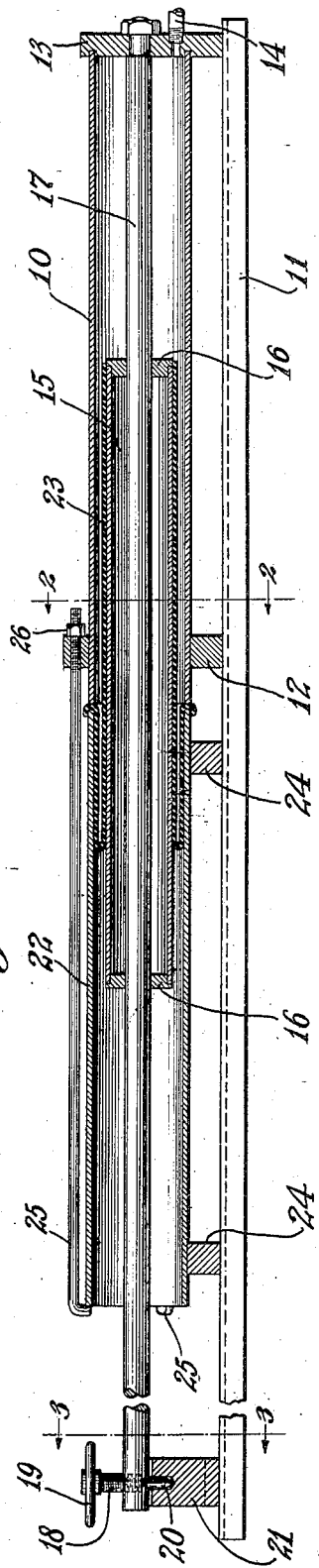
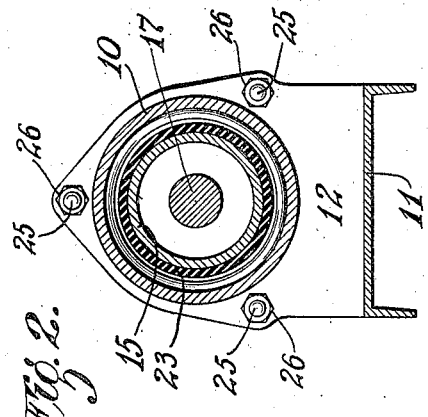
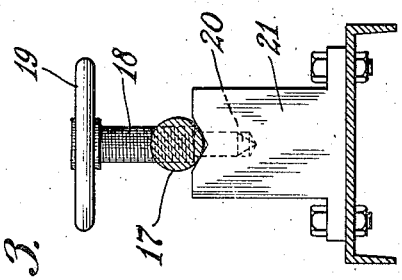
Inventors
Waldo L. Semon
Arthur W. Sloan
By Pinson, Eakin & Avery
Attys.

Patented July 23, 1929.

1,721,838

UNITED STATES PATENT OFFICE.

WALDO L. SEMON, OF CUYAHOGA FALLS, AND ARTHUR W. SLOAN, OF AKRON, OHIO, ASSIGNORS TO THE B. F. GOODRICH COMPANY, OF NEW YORK, N. Y., A CORPORATION OF NEW YORK.

METHOD AND APPARATUS FOR ADHESIVELY APPLYING TUBULAR LININGS TO METAL PIPES AND THE LIKE.

Application filed October 13, 1927. Serial No. 225,963.

This invention relates to methods and apparatus for adhesively applying tubular rubber linings to metal pipes and the like, which heretofore has been a matter of difficulty and of numerous expedients because of the inaccessibility of the inner surface of the long and narrow structure and because of the importance of so applying the tacky rubber tube, which is usually applied in an unvulcanized condition, as to expel all air from between the rubber tube and the pipe.

Our chief objects are to provide improved procedure and apparatus whereby the tubular lining may be applied to the pipe or the like progressively along the same, so that pocketing of air between the two will be avoided. More specific objects are to provide for progressive application of the lining with a strong pressure of the same against the pipe wall at and adjacent the advancing line of application such as to insure complete expulsion of the air and compacting of the lining against the pipe, and to provide simple, inexpensive, accurate and dependable apparatus for performing the operation.

Of the accompanying drawings:

Fig. 1 is a vertical, longitudinal section of apparatus embodying and adapted to carry out our invention in its preferred form.

Fig. 2 is a section on line 2—2 of Fig. 1.

Fig. 3 is a section on line 3—3 of Fig. 1.

Referring to the drawings, the apparatus comprises a tubular air-chamber or casing 10 preferably having about the same wall thickness and diameter as the pipe to be lined, the casing being supported in horizontal position a little above a table 11 by an apertured block 12 mounted upon the table and having one end portion of the casing extending therethrough and by an end-closure block 13 mounted upon the table and having the other end of the casing 10 set into the face thereof. The end-closure block 13 is formed with a fluid passage in which is threaded the end of a pipe 14 for conducting compressed air into the casing 10.

An elongated hollow lining-support 15 consisting of a tubular shell of a little less outside diameter than the inner diameter of the casing 10 and of the pipe to be lined and having apertured plugs 16, 16 mounted in its ends is slidably mounted upon a guide-rod 17 having a length preferably somewhat more than three times the length of the casing 10 and having a shouldered end by which it is secured in the end-closure block 13 of the casing 10 and the other end portion of the guide-rod is formed with a vertical threaded aperture for a supporting screw 18 provided at its upper end with a hand-wheel 19 and formed in its lower end portion as a dowel 20 which is adapted to seat in a dowel recess formed in the upper face of a block 21 which is mounted upon the table 11, the screw 18 being adapted to hold the guide-rod 17 centered in the casing 10 for the lining operation and to be removed from the guide-rod to permit a pipe 22, to be provided with a rubber lining 23, to be passed onto the guide-rod 17 and onto supporting blocks 24, 24 mounted upon the table 11 and adapted to support the pipe 22 in alignment with the casing 10, for clamping of one end of the lining 23 between the end faces of the casing 10 and the pipe 22 as shown in Fig. 1.

For holding the pipe 22 in such clamping relation to the lining 23 and the casing 10 a circumferential series of hook-bolts such as the bolts 25, 25 have their threaded ends mounted in apertures formed in the supporting block 12, the bolts being adapted for their hooked ends to take over the far end of the pipe 22, preferably without extending inward entirely across the wall thereof, and the bolts being provided with nuts 26, 26 for drawing them up to anchor the end margin of the lining 13 between the casing 10 and the pipe 22 and thus to provide a fluid seal between the two.

In the operation of the apparatus the lining 23 is built upon or is mounted upon the lining-support 15, preferably in unvulcanized condition, the lining support permissibly being removed from the guide-rod 17, and the face of the lining next to the support preferably being provided with an adhesive adapted to leave the support with the lining and to secure the latter to the pipe during vulcanization, and the lining-support with the lining thereon is run upon the guide-rod 17 into the casing 10.

The pipe 22 to be lined is then passed onto the guide-rod 17 and allowed to rest on the supporting blocks 24 with its inner end adjacent the outer end of the casing 10. The supporting screw 18 is then mounted in the outer end of the guide-rod and in the block 21 and is adjusted to center the guide-rod 17 in the casing 10.

The outer end of the lining 23 is then drawn outward between the adjacent ends of the casing 10 and the pipe 22 and clamped between the two by engaging the outer ends of the hook-bolts 25 with the outer end of the pipe and setting up the nuts 26.

Compressed air is then let into the casing 10 through the pipe 14, which drives the lining-support 15 along the guide-rod 17 and causes the lining 23 to be turned inside out, the compressed air pressing the lining into progressive contact with the inner face of the pipe 22 and causing it to leave the support 15 and reverse itself onto the inner surface of the pipe in an evenly tensioned condition, without wrinkles.

The small difference in size between the lining-support and the pipe results in a comparatively thin annular space between the portions of the tube contacting the outer face of the support 15 and the inner face of the pipe respectively, so that the surface of the stock pressed in an axial direction by the air at the turn of the tube is of small area, which permits the use of relatively high air pressure without rupture of the lining. The development of comparatively high air pressure for pressing the lining in place may be effected by retarding the movement of the lining-support by any suitable means.

When the lining has been completely applied to the pipe as described the pipe with the lining therein is subjected to a vulcanizing operation in accordance with known or suitable procedure as may be desired, the absence of entrapped air between the lining and the pipe and the even tension of the lining resulting in a high quality product.

Modifications are possible within the scope of our invention as defined in the appended claims.

We claim:

1. The method of applying a tubular lining of flexible, stretchable and adhesive material to a hollow article which comprises passing the lining into the hollow article while turning it inside out and progressively securing it adhesively in place by pressing it against the inner face of the article.

2. The method of applying a tubular lining of flexible, stretchable and adhesive material to a hollow article which comprises passing the lining into the article while turning it inside out and securing it adhesively in place by pressing it against the inner face of the article under the force of a pressure fluid.

3. The method of applying a tubular lining of rubber to a hollow article which comprises passing the lining into the hollow article while turning it inside out and progressively securing it adhesively in place by pressing it against the inner face of the article and vulcanizing the lining in place in the article.

4. The method of applying a tubular lining of rubber to a hollow article which comprises passing the lining into the hollow article while turning it inside out and progressively securing it adhesively in place by pressing it against the inner face of the article under the force of a pressure fluid and vulcanizing the lining in place in the article.

5. Apparatus for applying a tubular lining to a hollow article, the said apparatus comprising a support adapted to fit within the lining, means for centering the said support within and guiding it along the article, and means for applying fluid pressure to the lining within a fold thereof having its two elements bearing against the support and against the inner face of the article respectively.

6. Apparatus as defined in claim 5 in which the means for centering and guiding the lining support comprises a guide-bar extending through the said support.

7. Apparatus for applying a tubular lining to a hollow article, the said apparatus comprising a support adapted to fit within the lining, means for centering the said support within and guiding it along the article, and means for applying fluid pressure to the lining within a fold thereof having its two elements bearing against the support and against the inner face of the article respectively, the means for applying fluid pressure comprising a casing adapted to receive within it the lining support with the lining thereon and to be sealed against an end portion of the lining spread away from the support and the centering and guiding means comprising a guide bar having one end mounted in the end wall of the casing and its other end portion projecting from the casing, and means for adjustably and detachably supporting the said end portion.

In witness whereof we have hereunto set our hands this 11th day of October, 1927.

WALDO L. SEMON.
ARTHUR W. SLOAN.